(12) United States Patent
Tamai et al.

(10) Patent No.: US 10,960,883 B2
(45) Date of Patent: Mar. 30, 2021

(54) METHOD AND APPARATUS FOR CONTROLLING A VEHICLE IN A COASTING MODE

(71) Applicant: GM Global Technology Operations LLC, Detroit, MI (US)

(72) Inventors: Goro Tamai, Bloomfield Hills, MI (US); Birendra P Bhattarai, Novi, MI (US); Daniel E Nicholson, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 84 days.

(21) Appl. No.: 16/133,022

(22) Filed: Sep. 17, 2018

(65) Prior Publication Data

US 2020/0086872 A1 Mar. 19, 2020

(51) Int. Cl.
*B60W 30/18* (2012.01)
*B60W 10/06* (2006.01)

(52) U.S. Cl.
CPC ...... *B60W 30/18072* (2013.01); *B60W 10/06* (2013.01); *B60W 2030/1809* (2013.01); *B60W 2510/104* (2013.01); *B60W 2510/105* (2013.01)

(58) Field of Classification Search
CPC .......... B60W 30/18072; B60W 10/06; B60W 2030/1809; B60W 2510/105; B60W 2510/104
See application file for complete search history.

(56) References Cited

U.S. PATENT DOCUMENTS

2015/0258973 A1* 9/2015 Hawkins ............... B60W 20/10
701/22
2019/0351908 A1* 11/2019 Marsden ........... B60W 50/0097

FOREIGN PATENT DOCUMENTS

JP 2005030400 a 2/2005

* cited by examiner

*Primary Examiner* — Anne Marie Antonucci
(74) *Attorney, Agent, or Firm* — Quinn IP Law (57) ABSTRACT

A powertrain system for a vehicle is described, and includes an internal combustion engine that is selectively coupled to a driveline. The engine is configured to operate in a coasting mode, wherein the coasting mode includes operating the powertrain system with the engine in an OFF state and decoupled from the driveline. Devices are configured to monitor an output torque request, vehicle speed, and vehicle operating conditions. An executable instruction set monitors the vehicle speed and the output torque request. The engine is controlled to operate in the coasting mode when the output torque request is within the predetermined torque region and the vehicle speed is greater than a minimum speed threshold. The engine is controlled to discontinue operating in the coasting mode in response to the output torque request being outside the torque region of the vehicle speed being less than a minimum speed threshold.

16 Claims, 3 Drawing Sheets

METHOD AND APPARATUS FOR CONTROLLING A VEHICLE IN A COASTING MODE

INTRODUCTION

Vehicles employ propulsion systems that may include internal combustion engines and/or non-combustion torque machines to generate mechanical power that can be transferred to vehicle wheels, tracks or other traction devices for propulsion effort in response to operator commands. When an operator performs a throttle tip-out maneuver while the vehicle is moving, a vehicle control system may execute one or more control actions in response, including, e.g., closing the engine throttle and allowing the engine to spin while coupled to a geartrain to effect vehicle braking (referred to as engine braking), disconnecting an intervening torque converter clutch, executing engine fuel cut-off by decreasing or discontinuing fuel supply to the engine, operating an electric machine in a regenerative mode to capture vehicle momentum by generating electric power that can be stored in an on-board DC power source, etc. Such operations may decrease fuel consumption, improve operating range, and provide other benefits.

SUMMARY

A powertrain system for a vehicle is described, and includes an internal combustion engine being selectively coupled to a driveline. The internal combustion engine is configured to operate in a coasting mode, wherein the coasting mode includes operating the powertrain system with the internal combustion engine in an OFF state and decoupled from the driveline. Devices are configured to monitor an output torque request, vehicle speed, and vehicle operating conditions. A controller is in communication with the devices configured to monitor the output torque request, vehicle speed, and vehicle operating conditions, and operatively connected to the internal combustion engine. The controller includes an instruction set that is executable to monitor the vehicle speed and the output torque request. The controller controls the internal combustion engine to operate in the coasting mode when the output torque request is within the predetermined torque region and the vehicle speed is greater than a minimum speed threshold. The controller controls the internal combustion engine to discontinue operating in the coasting mode in response to the output torque request being outside the torque region of the vehicle speed being less than a minimum speed threshold.

Another aspect of the disclosure includes the internal combustion engine being selectively coupled to the driveline via a disconnect clutch, wherein the coasting mode includes the internal combustion engine being controlled in the OFF state and decoupled from the driveline via the disconnect clutch.

Another aspect of the disclosure includes the output torque request being with a predetermined torque region when output torque request is within a region of +5% and −5% torque.

Another aspect of the disclosure includes the internal combustion engine being controlled to discontinue operating in the coasting mode in response to an operator request for braking.

Another aspect of the disclosure includes the internal combustion engine being controlled to discontinue operating in the coasting mode in response to an operator request for acceleration.

Another aspect of the disclosure includes the instruction set being executable to determine secondary enablement criteria based upon inputs from the plurality of devices disposed to monitor the vehicle operating conditions, control the internal combustion engine to operate in the coasting mode when the output torque request is within the predetermined torque region, the vehicle speed is greater than the minimum speed threshold, and the secondary enablement criteria are met, and control the internal combustion engine to discontinue operating in the coasting mode in response to the secondary enablement criteria no longer being met.

Another aspect of the disclosure includes the plurality of devices disposed to monitor vehicle operating conditions including an engine coolant temperature sensor, wherein the secondary enablement criteria includes engine coolant temperature, and wherein the instruction set is executable to control the internal combustion engine to discontinue the operating in the coasting mode when the engine coolant temperature is less than a minimum temperature, wherein the minimum temperature is associated with internal combustion engine operation to achieve a minimum exhaust temperature for exhaust purification.

Another aspect of the disclosure includes the plurality of devices disposed to monitor vehicle operating conditions including an engine coolant temperature sensor, wherein the secondary enablement criteria includes engine coolant temperature, and wherein the instruction set is executable to control the internal combustion engine to discontinue the operating in the coasting mode when the engine coolant temperature is greater than a maximum temperature.

Another aspect of the disclosure includes the plurality of devices disposed to monitor vehicle operating conditions including an ambient temperature sensor, wherein the secondary enablement criteria includes ambient temperature, and wherein the instruction set is executable to control the internal combustion engine to discontinue the operating in the coasting mode when the ambient temperature is less than a minimum temperature.

Another aspect of the disclosure includes the plurality of devices disposed to monitor vehicle operating conditions including an ambient temperature sensor, wherein the secondary enablement criteria includes ambient temperature, and wherein the instruction set is executable to control the internal combustion engine to discontinue the operating in the coasting mode when the ambient temperature is greater than a maximum temperature.

Another aspect of the disclosure includes an electric machine being rotatably coupled to the internal combustion engine, wherein the plurality of devices disposed to monitor vehicle operating conditions including a device disposed to monitor a battery that is electrically connected to the electric machine, wherein the secondary enablement criteria includes battery state-of-charge (SOC), and wherein the instruction set is executable to control the internal combustion engine to discontinue the operating in the coasting mode when the battery SOC is less than a minimum SOC.

Another aspect of the disclosure includes the plurality of devices disposed to monitor vehicle operating conditions including a cabin environmental control switch that is configured to control operation of a heating-ventilation-air-condition (HVAC) system, wherein the secondary enablement criteria includes activation of the HVAC system, and wherein the instruction set is executable to control the internal combustion engine to discontinue the operating in the coasting mode when the HVAC system is activated.

Another aspect of the disclosure includes the vehicle further including a cruise control system configured to control the powertrain system to generate torque to maintain vehicle speed at a target speed, wherein the target speed includes a speed offset. The instruction set is executable to determine activation of the cruise control system, and control the internal combustion engine to operate in the coasting mode with the cruise control system being activated. The internal combustion engine is controlled to discontinue the operating in the coasting mode only when the vehicle speed supersedes the target speed combined with the speed offset, wherein the speed offset is increased when the cruise control system is activated.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. Furthermore, the disclosure, as illustrated and described herein, may be practiced in the absence of an element that is not specifically disclosed herein. Like reference numerals correspond to like or similar components throughout the several Figures.

Figure 1:
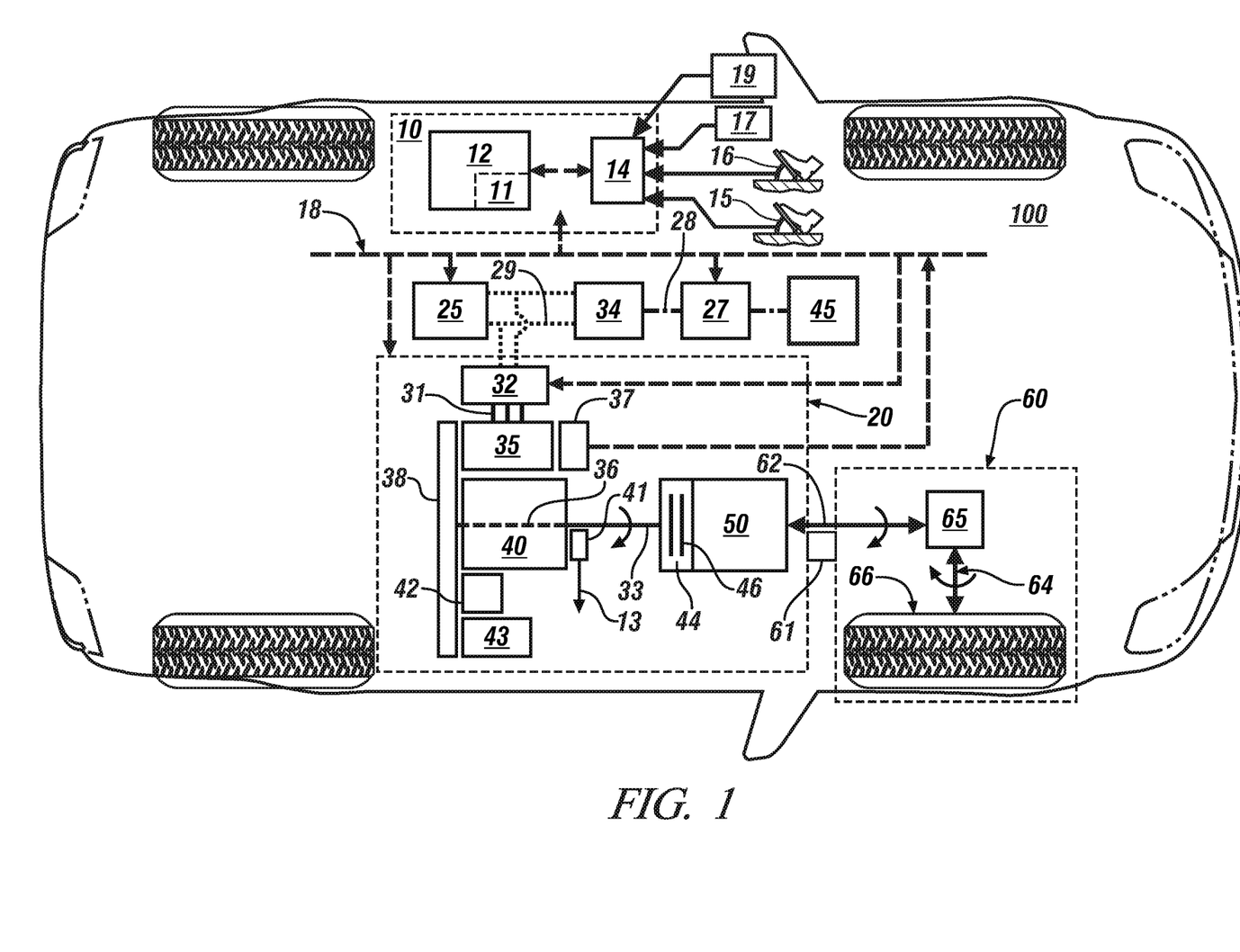
FIG. 1 schematically illustrates a powertrain system and drivetrain for a vehicle, in accordance with the disclosure.

Referring now to the drawings, which are provided for the purpose of illustrating certain exemplary embodiments and not for the purpose of limiting the same, FIG. 1, consistent with embodiments disclosed herein, illustrates a powertrain system 20 and driveline 60 that are disposed in a vehicle 100. The vehicle 100 may include, but not be limited to a mobile platform in the form of a passenger vehicle, commercial vehicle, industrial vehicle, agricultural vehicle, aircraft, watercraft, train, all-terrain vehicle, personal movement apparatus, robot and the like to accomplish the purposes of this disclosure.

The powertrain system 20 is composed of one or a plurality of torque generating devices, each of which is able to transform stored energy to mechanical power for transfer to tractive wheels via the driveline 60, and ancillary devices. In the illustrated embodiment, the powertrain system 20 includes an internal combustion engine 40 that is coupled to an electrically-powered torque machine (electric machine) 35. Alternatively, another non-combustion torque machine, such as a pneumatically-powered device or a hydraulically-powered device, may be employed in place of the electric machine 35. By way of definition, a non-combustion torque machine is a device that is capable of generating torque by converting a potential energy source to kinetic energy without combustion of the potential energy. Non-limiting examples of the potential energy source may include electric energy, pneumatic energy and hydraulic energy. Pneumatically-powered devices and hydraulically-powered devices are not described in detail herein. Embodiments of the powertrain system 20 and vehicle 100 described with reference to FIG. 1 are illustrative. Other embodiments, including other torque generating devices, may be employed within the scope of this disclosure.

The powertrain system 20 is composed of the internal combustion engine 40 having a crankshaft 36 that couples to the electric machine 35 via a pulley mechanism 38, and is controlled by a controller 10. The crankshaft 36 of the internal combustion engine 40 also rotatably couples via a rotating member 33 to a torque converter 44 of a geartrain 50 that is coupled to the driveline 60.

The electric machine 35 and the internal combustion engine 40 are torque-generating devices. The electric machine 35 includes an output member that mechanically rotatably couples to the crankshaft 36 of the internal combustion engine 40 via the pulley mechanism 38, which provides a mechanical power path therebetween. The pulley mechanism 38 is configured to effect torque transfer between the internal combustion engine 40 and the electric machine 35, including transferring torque from the electric machine 35 to the internal combustion engine 40 for engine autostart/autostop operation, tractive torque assistance, and regenerative braking, and transferring torque from internal combustion engine 40 to the electric machine 35 for high-voltage electrical charging. In one embodiment, the pulley mechanism 38 includes a serpentine belt routed between the pulley attached to the crankshaft 36 of the internal combustion engine 40 and another pulley attached to the output member of the electric machine 35, wherein the output member of the electric machine 35 which may be a rotatable shaft coupled to a rotor of the electric machine 35. Such a system may be referred to as a belt-alternator-starter (BAS) system. Alternatively, the pulley mechanism 38 may include another torque coupling mechanism, such as a positive-displacement gearing mechanism or a flexible chain. The geartrain 50 includes an output member 62 that is coupled to the driveline 60. In one embodiment, the ancillary devices of the internal combustion engine 40 may include a low-voltage solenoid-actuated electrical starter 42 for starting in response to a key-crank event. In one embodiment, the ancillary devices of the internal combustion engine 40 include a heating-ventilation-air conditioning (HVAC) system 43 that is provided mechanical power from the internal combustion engine 40, such as via the pulley mechanism 38.

The internal combustion engine 40 is a multi-cylinder internal combustion engine that converts fuel to mechanical power through a combustion process. The internal combustion engine 40 is equipped with a plurality of actuators and sensing devices for monitoring operation and delivering fuel and ignition to form and ignite a combustion charge to produce torque that is responsive to an output torque request. The sensing devices may include a crankshaft position sensor 41, which may be a rotational position sensing system that directly communicates via a wiring harness 13 to control module 12 and communicates via a communications bus 18 to inverter controller 11. The internal combustion engine 40 may be controlled to an ON state, a fuel cut-off state (FCO), or an OFF state. The ON state is characterized by engine operation that is spinning and fueled. The FCO state is characterized by engine operation that is spinning but unfueled. The OFF state is characterized by engine operation that is not spinning, i.e., is at zero engine speed and is unfueled.

The electric machine 35 is configured as a high-voltage multi-phase electric motor/generator that is operable to convert stored electric energy to mechanical power and operable to convert mechanical power to electric energy that may be stored in a high-voltage DC power source (battery) 25. The electric machine 35 includes a rotor and a stator and an accompanying motor position sensor 37, which may be a resolver, a Hall effect sensor, or another suitable rotational position sensing mechanism. The inverter controller 11 may be co-located within the inverter module 32 (as shown) or, alternatively, may be remotely located, e.g., within the controller 10.

The high-voltage battery 25 electrically connects to the inverter module 32 via a high-voltage DC bus 29 to transfer high-voltage DC electric power to the electric machine 35 in response to control signals originating in the controller 10. In one embodiment, high-voltage DC electric power may be a 48 Vdc system. In one embodiment, high-voltage DC electric power may be a 300 Vdc system. The inverter module 32 electrically connects to the electric machine 35 via a multi-phase motor control power bus 31. The inverter module 32 is configured with suitable control circuits including power transistors, e.g., IGBTs for transforming high-voltage DC electric power to high-voltage AC electric power and transforming high-voltage AC electric power to high-voltage DC electric power. The inverter module 32 can employ pulsewidth-modulating (PWM) control to convert stored DC electric power originating in the high-voltage battery 25 to AC electric power to drive the electric machine 35 to generate torque. Similarly, the inverter module 32 converts mechanical power transferred to the electric machine 35 to DC electric power to generate electric energy that is storable in the high-voltage battery 25, including as part of a regenerative control strategy. It is appreciated that the inverter module 32 is configured to receive motor control commands and control inverter states to provide the motor drive and regeneration functionality.

In one embodiment, a DC/DC electric power converter 34 electrically connects to a low-voltage bus 28 and a low-voltage battery 27, and electrically connects to the high-voltage bus 29. The low-voltage battery 27 may electrically connect to an auxiliary power system 45 to provide low-voltage electric power to low-voltage systems on the vehicle, including, e.g., electric windows, HVAC fans, seats, and the low-voltage solenoid-actuated electrical starter 42 in one embodiment. In one embodiment, low-voltage DC electric power may be a 12 Vdc system. Alternatively, the electric power converter 34 may provide low-voltage electric power to the low-voltage systems on the vehicle, thus supplanting the auxiliary power system 45.

The torque converter 44 is a rotatable torque coupling device arranged between the internal combustion engine 40 and the geartrain 50. The torque converter 44 includes fluid torque coupling via an internal pump and vanes and mechanical torque coupling via a disconnect clutch mechanism.

An engine disconnect clutch 46 is disposed between the internal combustion engine 40 and the geartrain 50, and may be a stand-alone component or, alternatively, incorporated into the torque converter 44. The engine disconnect clutch 46 is selectively activated by the controller 10 to couple the internal combustion engine 40 and the geartrain 50 to effect torque transfer therebetween. The engine disconnect clutch 46 may be configured as a one-way clutch, a disc clutch, or another clutch arrangement. Alternatively, the engine disconnect clutch 46 may be disposed between the geartrain 50 and the driveline 60, or at another location that facilitates coupling and decoupling of rotation of the internal combustion engine 40 and the driveline 60.

The geartrain 50 may be arranged as a transmission having a step-gear configuration, and may include one or more differential gear sets and activatable clutches configured to effect torque transfer in one of a plurality of step-gear states over a range of speed ratios between the internal combustion engine 40 and the output member 62. The geartrain 50 may be configured as an automatic transmission to automatically shift between the step-gear states to operate at a gear ratio that achieves a desired match between an output torque request and an engine operating point in one embodiment. Alternatively, the geartrain 50 may be configured as a continuously-variable transmission, a manual transmission, a dual-clutch transmission or another arrangement. Operation of the geartrain 50 may be controlled by a transmission controller (not shown), which communicates with the controller 12. The driveline 60 may include a differential gear device 65 that mechanically couples to an axle 64 or half-shaft that mechanically couples to a wheel 66 in one embodiment. The driveline 60 transfers tractive power between the geartrain 50 and a road surface. Vehicle speed may be monitored via a speed sensor 61, which may be a rotational position sensor that is disposed to monitor rotation of the output member 62. Alternatively, vehicle speed may be monitored or otherwise determined employing a wheel speed sensor or another sensor that is configured to monitor vehicle movement relative to ground surface. The powertrain system 20 is illustrative, and the concepts described herein apply to other powertrain systems that are similarly configured.

The controller 10 may include a control module 12 that communicates to an operator interface 14. The control module 12 communicates with individual elements of the powertrain system 20 either directly or via the communications bus 18. The control module 12 communicates to the sensing devices of each of the high-voltage battery 25, the inverter module 32, the electric machine 35, the internal combustion engine 40 and the geartrain 50 to monitor operation and determine parametric states thereof. The operator interface 14 of the vehicle 100 includes a plurality of human/machine interface devices through which the vehicle operator commands operation of the vehicle 100, including, e.g., an ignition switch to enable an operator to crank and start the internal combustion engine 40, an accelerator pedal 15, a brake pedal 16, a transmission range selector (PRNDL) 17, a cruise control actuator 19, a steering wheel, and other operator-controlled switches and actuators, such as a headlamp switch and cabin environmental control switches that control operation of the HVAC system 43.

The accelerator pedal 15 provides a signal input including an accelerator pedal position indicating an operator request for vehicle acceleration and the brake pedal 16 provides signal input including a brake pedal position indicating an operator request for vehicle braking. The combination of the operator input to the accelerator pedal 15, the operator input to the brake pedal 16 and operator input to the cruise control actuator 19 form the output torque request. The transmission range selector 17 provides signal input indicating direction of operator-intended motion of the vehicle including a discrete number of operator-selectable positions indicating the desired rotational direction of the output member 62 in either a forward or a reverse direction. The cruise control actuator 19 provides a signal input indicating an operator request to set a target vehicle speed. In one embodiment, the cruise control actuator 19 is a stand-alone device. Alternatively, the cruise control actuator 19 is an input device for an adaptive cruise control device, or an input device associated with a level of autonomous vehicle functionality. When the vehicle 100 includes autonomous functionality, the output torque request may be provided by an autonomous controller (not shown) that generates an output torque request that may supplement or supplant the operator input to the accelerator pedal 15 and the operator input to the brake pedal 16.

Communication in the form of sensor signals and actuator command signals between the controller 10 and elements of the powertrain system 20 may be accomplished using one or more communications systems and devices, including, e.g., the communications bus 18, a direct connection, a local area network bus, a serial peripheral interface bus, and wireless communications.

The terms controller, control module, module, control, control unit, processor and similar terms refer to a single one or combinations of Application Specific Integrated Circuit (s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 2 milliseconds during ongoing operation. Alternatively, routines may be executed in response to occurrence of a triggering event. Communication between controllers, and communication between controllers, actuators and/or sensors may be accomplished using a direct wired link, a networked communications bus link, a wireless link or another suitable communications link. Communication includes exchanging data signals in suitable form, including, for example, electrical signals via a conductive medium, electromagnetic signals via air, optical signals via optical waveguides, and the like. Data signals may include signals representing inputs from sensors, signals representing actuator commands, and communication signals between controllers.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The term "calibrate" and related terms refer to a result or a process that compares an actual or standard measurement associated with a device with a perceived or observed measurement or a commanded position. A calibration value is a parameter that is derived from a calibration process. A parameter is defined as a measurable quantity that represents a physical property of a device or other element that is discernible using one or more sensors and/or a physical model. A parameter can have a discrete value, e.g., either "1" or "0", or can be infinitely variable in value. A calibration as described herein can be reduced to a storable parametric table, a plurality of executable equations or another suitable form.

Operation of an aspect of the powertrain system 20 is described with reference to FIGS. 2, 3 and 4. The powertrain system 20 employs the internal combustion engine 40 that is selectively coupled to the driveline 60, such as may be accomplished in one embodiment via activation of the engine disconnect clutch 46. The internal combustion engine 40 is configured to operate in a coasting mode, wherein the coasting mode includes operating the powertrain system 20 with the internal combustion engine 40 in an OFF state and decoupled from the driveline 60 with the vehicle 100 operating at a speed that is greater than a minimum threshold speed. The electric machine 35 may be coupled to the internal combustion engine 40 in one embodiment. The controller 10 includes an instruction set that is executable to monitor the vehicle speed and an output torque request, and also determine secondary enablement criteria based upon inputs from a plurality of devices disposed to monitor vehicle operating conditions. The internal combustion engine 40 is controlled to operate in the coasting mode when the output torque request is within a predetermined torque region, the vehicle speed is greater than a minimum speed threshold, and the secondary enablement criteria are met. Operation in the coasting mode is discontinued in response to the output torque request being outside the predetermined torque region, the vehicle speed being less than a minimum speed threshold, or the secondary enablement criteria no longer being met.

Figure 2:
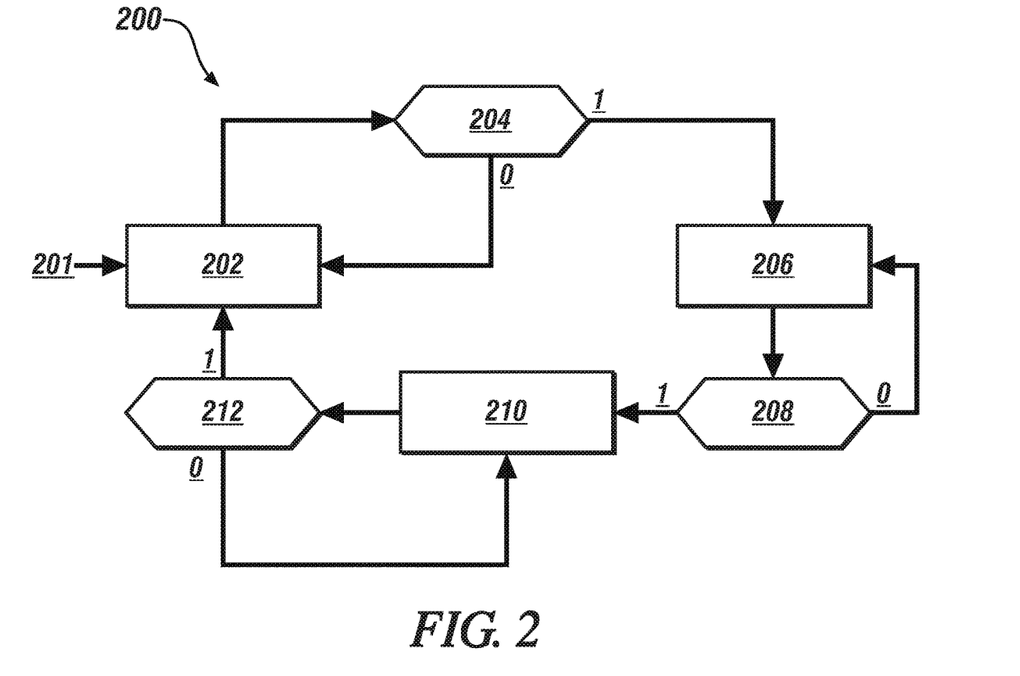
FIG. 2 is a flowchart illustrating a coasting mode activation method associated with controlling operation of a vehicle in a coasting mode, in accordance with the disclosure.

FIG. 2 is a flowchart illustrating a coasting mode activation method 200, which advantageously controls operation of the vehicle 100 in a coasting mode, wherein one embodiment of the vehicle 100 is described with reference to FIG. 1. This includes controlling operation to enter and/or exit the coasting mode. The teachings are described herein in terms of functional and/or logical block components and/or various processing steps. Such block components may be composed of hardware, software, and/or firmware components that have been configured to perform the specified functions.

The coasting mode activation method 200 advantageously operates in a manner that may reduce fuel consumption and/or may increase battery charge, and also may minimize 'busyness' associated with entry into and exit out of operation in the coasting mode. The coasting mode activation method 200 may be implemented through a computer algorithm, machine executable code, non-transitory computer-readable medium, or software instructions programmed into a suitable programmable logic device(s) of the vehicle, such as the controller 10. Alternatively, the coasting mode activation method 200 may be implemented in another controller in the vehicle, or a combination of multiple controllers. Although the various steps shown in the flowchart diagram appear to occur in a chronological sequence, at least some of the steps may occur in a different order, and some steps may be performed concurrently or not at all.

As used herein, the coasting mode refers to a powertrain operating mode in which the vehicle 100 is operating at a vehicle speed that is greater than zero miles per hour, the internal combustion engine 40 is in the OFF state, i.e., not spinning, and the internal combustion engine 40 is decoupled from the driveline 60, such as by controlling the engine disconnect clutch 46 to the open state, i.e., disengaging the engine disconnect clutch 46. Furthermore, other torque generating devices (not shown in the embodiment illustrated in FIG. 1) are not generating torque that would otherwise be employed for propulsion or tractive effort. As such, vehicle speed during operation in the coasting mode is based upon an initial vehicle speed upon entering the coasting mode, friction in the driveline 60, rolling resistance of the vehicle wheels 66, wind resistance, and surface grade of the travel surface of the vehicle 100.

The coasting mode activation method 200 proceeds as follows. As employed herein, the term "1" indicates an answer in the affirmative, or "YES", and the term "0" indicates an answer in the negative, or "NO". Initially (201), the vehicle 100 controls operation of the powertrain system 20 in response to the output torque request (202), while continually monitoring a plurality of primary and secondary enablement criteria associated with coasting activation (204). The primary enablement criteria associated with entry into the coasting mode include vehicle speed and the output torque request. The coasting mode activation method 200 will consider entry into the coasting mode only when the vehicle speed is within a permissible speed operating band in conjunction with the output torque request being within a band that includes the operator input to the accelerator pedal 15 being at or near 0% and the operator input to the brake pedal 16 being at or near 0%. Additional details related to entry into the coasting mode are illustrated with reference to FIGS. 3 and 4, and their associated descriptions.

Entry into the coasting mode includes controlling the internal combustion engine 40 to an OFF state, i.e., not spinning, and opening or deactivating the engine disconnect clutch 46 to decouple the internal combustion engine 40 from the driveline 60. Exiting the coasting mode includes controlling the internal combustion engine 40 to an ON state or an FCO state, i.e., spinning, and closing or activating the engine disconnect clutch 46 to couple the internal combustion engine 40 to the driveline 60.

The secondary enablement criteria may be employed to override or otherwise preclude entry into the coasting mode when the primary enablement criteria associated with entry into the coasting mode have been satisfied. The secondary enablement criteria include, by way of non-limiting examples, a state-of-charge (SOC) of the high-voltage battery 25, ambient temperature, engine coolant temperature, HVAC control commands, steering commands, grade of the travel surface, operation of the cruise control system, etc.

When the primary enablement criteria associated with entry into the coasting mode have been achieved and the secondary enablement criteria associated with entry into the coasting mode have been met, entry into the coasting mode is commanded (204)(1). Simply stated, entry into the coasting mode is commanded when a predetermined vehicle speed profile band can be met with the internal combustion engine in the OFF state. Otherwise (204)(0), monitoring continues without commanding operation in the coasting mode. During operation in the coasting mode, the controller 20 periodically monitors the primary and secondary enablement criteria (206) to verify that operation in the coasting mode is able to continue (208)(0), or alternatively, determine that operation in the coasting mode will be commanded to end due to the achievement of one or more exit conditions (208)(1). Upon exiting the coasting mode, normal operation of the powertrain system resumes (210). Re-entry into the coasting mode is permitted when the entry criteria are met again (212)(1). Otherwise (212)(0), normal operation of the powertrain system continues (210).

Thus, by way of example, when coasting has been exited in response to operator braking, the internal combustion engine 40 can be restarted and operated in the FCO mode with braking being supplied as regenerative braking that is achieved via operation of the electric machine 35 to react driveline torque that is a result of vehicle momentum to generate electric power. Such operation avoids a discernible, unexpected torque dip.

Entry into the coasting mode can be permitted when the output torque request can be met with engine-off torque being within a +/− calibration offset. During an accelerator pedal tip-out maneuver, the output torque request may be set to a value for a desired speed profile. Output torque requests can be met employing several torque management processes, including commanding the internal combustion engine 40 to operate in FCO mode and controlling the electric machine 35 in a torque assist mode or a regenerative braking mode, when available. When the output torque request increases, such as by a vehicle operator requesting more positive torque, the electric machine 35 can provide additional torque. When the output torque request decreases, the electric machine 35 can operate at increased regenerative braking level up to the power storage capacity of the DC power source and the reactive torque capability of the electric machine 35. The coasting mode can also meet the output torque request, although the electric machine 35 may be decoupled from the driveline 60 in the embodiment shown with reference to FIG. 1 and thus be incapable of assisting in regenerative braking or torque assistance during operation in the coasting mode.

Thus, entry into the coasting mode is permitted when the output torque request can be achieved with engine-off torque, e.g., achieved via vehicle momentum. During operation in the coasting mode, the electric machine 35 is unable to provide torque assistance or regenerative braking in this embodiment, so the output torque request cannot be met with the electric machine 35. If the vehicle operator requests additional positive torque during operation in the coasting mode, the vehicle speed will start to reduce and eventually exit out of the vehicle speed profile band. However if the vehicle operator is requesting more negative torque, this torque request can be met by applying the friction brakes. Friction brake torque can be applied to meet the more negative driver torque request to an extent. However, if the friction brake torque increases to be greater than a calibration threshold, there may be fuel economy gains achieved by exiting the coasting mode and operating the internal combustion engine 40 in the FCO mode with regenerative braking via the electric machine 35.

Entry into the coasting mode is also conditional based upon parameters associated with the high-voltage battery 25 and/or the low-voltage battery 27 as they relate to being able to effect an engine restart. Thus, the SOC of the battery that is used to restart the internal combustion engine 40 needs to be within a calibrated range. In applications wherein the internal combustion engine 40 is restarted with the low-voltage solenoid-actuated electrical starter 42, the SOC and state of health (SOH) of the low-voltage battery 27 are evaluated to verify they are within allowable calibration ranges. In applications wherein the internal combustion engine 40 is restarted with the electric machine 35, the SOC, SOH, and other power limits, current limits, and voltage limits associated with the high-voltage battery 25 are evaluated to verify they are within allowable calibration ranges.

Entry into the coasting mode is also conditional based upon a position of the accelerator pedal 15 being less than a calibration value, a position of the brake pedal 16 being less than a calibration value, and the road grade being within a calibration band. One example of a calibration band for the road grade may be a road grade being between −5% (descending grade) and +2% (ascending grade).

Entry into the coasting mode may also be conditional upon operation of the HVAC system 43. During operation in the coasting mode, the HVAC system 43 that is connected to the crankshaft 36 will not be operational, and thus the HVAC system 43 will not be able to provide cabin cooling. If the vehicle operator is requesting cooling and if it can only be provided with the spinning crankshaft, then the coasting mode cannot be entered.

Entry into the coasting mode may also be conditional upon the vehicle speed being within a calibration speed band. One example of a calibration speed band for vehicle speed may be a vehicle speed that is greater than 10 mph and less than 50 mph.

Entry into the coasting mode may also be conditional upon the engine coolant temperature being within a calibration temperature band. One example of a calibration band for engine coolant temperature may be coolant temperature that is greater than 30 C and less than 90 C.

Entry into the coasting mode may also be conditional upon the ambient air temperature being within a calibration temperature band. One example of a calibration band for ambient temperature may be ambient temperature that is greater than 10 C and less than 22 C.

Entry into the coasting mode may also be conditional upon activation of cruise control to operate the vehicle at a target speed. In one embodiment, operating in cruise control includes controlling the powertrain system 20 to generate torque to maintain vehicle speed at a target vehicle speed, within permissible positive and negative speed offsets. The positive and negative speed offsets are differential speed levels that are added (positive speed offset) or subtracted (negative speed offset) to the target vehicle speed. Thus, by way of illustration, a target vehicle speed may be set at 50 kph, and the positive and negative speed offsets associated with cruise control operation may be +/−2 kph, resulting in operating the powertrain system 20 to generate torque that maintains vehicle speed within a speed band between 48 kph and 52 kph. The positive and negative speed offsets operate as hysteresis offsets for the target vehicle speed to minimize occurrence of control actions of either acceleration or deceleration to maintain the vehicle at the target vehicle speed.

This may include having the cruise vehicle speed offsets being adjusted to permit expanded vehicle speed excursions when the coasting mode is active. Similarly, when an adaptive cruise control operation is enabled, expanded vehicle speed excursions are permitted when the coasting mode is active.

When the vehicle is operating in the coasting mode with activated cruise control, the target cruise speed can be adjusted and/or the target speed offsets can be adjusted to delay a need to exit the operation in the coasting mode based upon vehicle speed and thus extend the period of time the vehicle continues operating in the coasting mode. In one embodiment, when the vehicle is operating in the coasting mode with activated cruise control, the original positive and negative speed offsets of +/−2 kph associated with operation in cruise control operation may be increased to positive and negative speed offsets of +/−3 kph that are associated with cruise control operation in the coasting mode to extend the period of time the vehicle operates in the coasting mode. Alternatively, when the vehicle is operating in the coasting mode with activated cruise control, the target cruise speed may be reduced from an initial target cruise speed, such as by reducing the target cruise speed by 2 kph from the initial target cruise speed to extend the period of time the vehicle operates in the coasting mode. Furthermore, when the vehicle is employing an adaptive cruise control system that has been activated, original positive and negative speed offsets may be greater than those associated with cruise control, e.g., +/−3 kph. Operation in the coasting mode with the adaptive cruise control mode being activated may include increasing the positive and negative speed offsets, e.g., to +/−4 kph, to extend the period of time the vehicle operates in the coasting mode. This adjustment to the speed offsets or adjustment to the target speed based upon operation in the coasting mode serves to reduce busyness related to activation and deactivation of the coasting mode.

The coasting mode may be exited in response to an inability to maintain vehicle speed within the vehicle speed profile band with the engine in the OFF mode.

The coasting mode may be exited in response to an output torque request being greater than the engine-off torque coupled with a calibration offset, which may indicate that the operator is commanding vehicle acceleration.

The coasting mode may be exited in response to an output torque request being less than the engine-off torque and friction brake torque, which may indicate that the operator is commanding vehicle braking. Thus the coasting mode may be exited in order to permit regenerative braking and electric power capture.

The coasting mode may be exited in response to one or more of the battery parameters, e.g., SOC, SOH, being outside an acceptable range.

The coasting mode may be exited in response to an operator request for a change in cabin temperature that commands operation of the HVAC system 43.

The coasting mode may be exited in response to a determination that coolant or ambient temperatures are outside expected levels, thus indicating a need to operate the internal combustion engine 40, such as to achieve minimum a exhaust temperature for exhaust purification or to achieve an engine temperature necessary for providing cabin heating.

Figure 3:
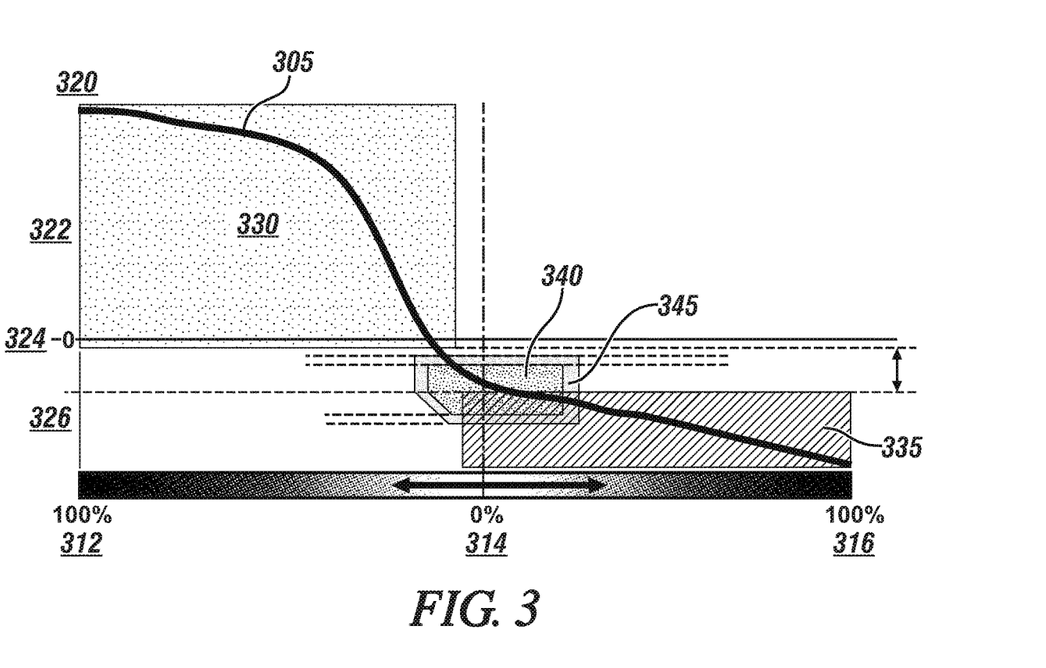
FIG. 3 graphically illustrates parameters associated with entering and exiting the coasting mode in relation to an output torque request and vehicle acceleration, in accordance with the disclosure.

FIG. 3 graphically illustrates parameters associated with entering and exiting the coasting mode in relation to an output torque request and vehicle acceleration for a nominal vehicle speed level, with continued reference to the vehicle 100 described with reference to FIG. 1. The horizontal axis indicates operator inputs to the brake pedal 16 and the accelerator pedal 15, including no operator input to either the accelerator pedal 15 or the brake pedal 16 (314), the accelerator pedal 15 being at 100% or wide-open throttle (WOT) 312, and the brake pedal 16 being at 100% or maximum braking 316. The vertical axis indicates vehicle acceleration 320, including zero acceleration 324, positive acceleration 322, and negative acceleration 326 or braking. An output torque request line 305 is also shown.

The area identified by numeral 330 indicates an operating region wherein the powertrain system 20 operates with the engine 40 operating in a fueled state to generate tractive power. The area indicated by numeral 335 indicates an operating region wherein operation of the powertrain system 20 includes the engine 40 operating in the FCO mode with braking effort being provided by regenerative braking effort and wheel braking.

The region indicated by numeral 340 indicates an operating region wherein it is permissible for the powertrain system 20 to enter into and operate in the coasting mode, i.e., the primary enablement criteria described with reference to FIG. 2 have been achieved. An inability to achieve or satisfy the secondary enablement criteria may preclude entry into the coasting mode. An outer region 345 of the coasting mode region 340 includes allowance for hysteresis in the accelerator pedal 15 input, the brake pedal input and upper and lower vehicle speed levels associated with the primary enablement criteria for entry into and exit out of the coasting mode in order to limit "busyness".

As indicated, the coasting mode region 340 may be entered at low levels of accelerator pedal 15 input and low levels of brake pedal 16 input with the vehicle 100 decelerating, so long as the secondary enablement criteria are met. The low levels of accelerator pedal 15 input and low levels of brake pedal 16 input are affected by vehicle grade, such that when the vehicle 100 is on a descending grade, the coasting mode region 340 may shift in order to permit entry into the FCO mode to effect regenerative braking to charge the battery 25.

Figure 4:
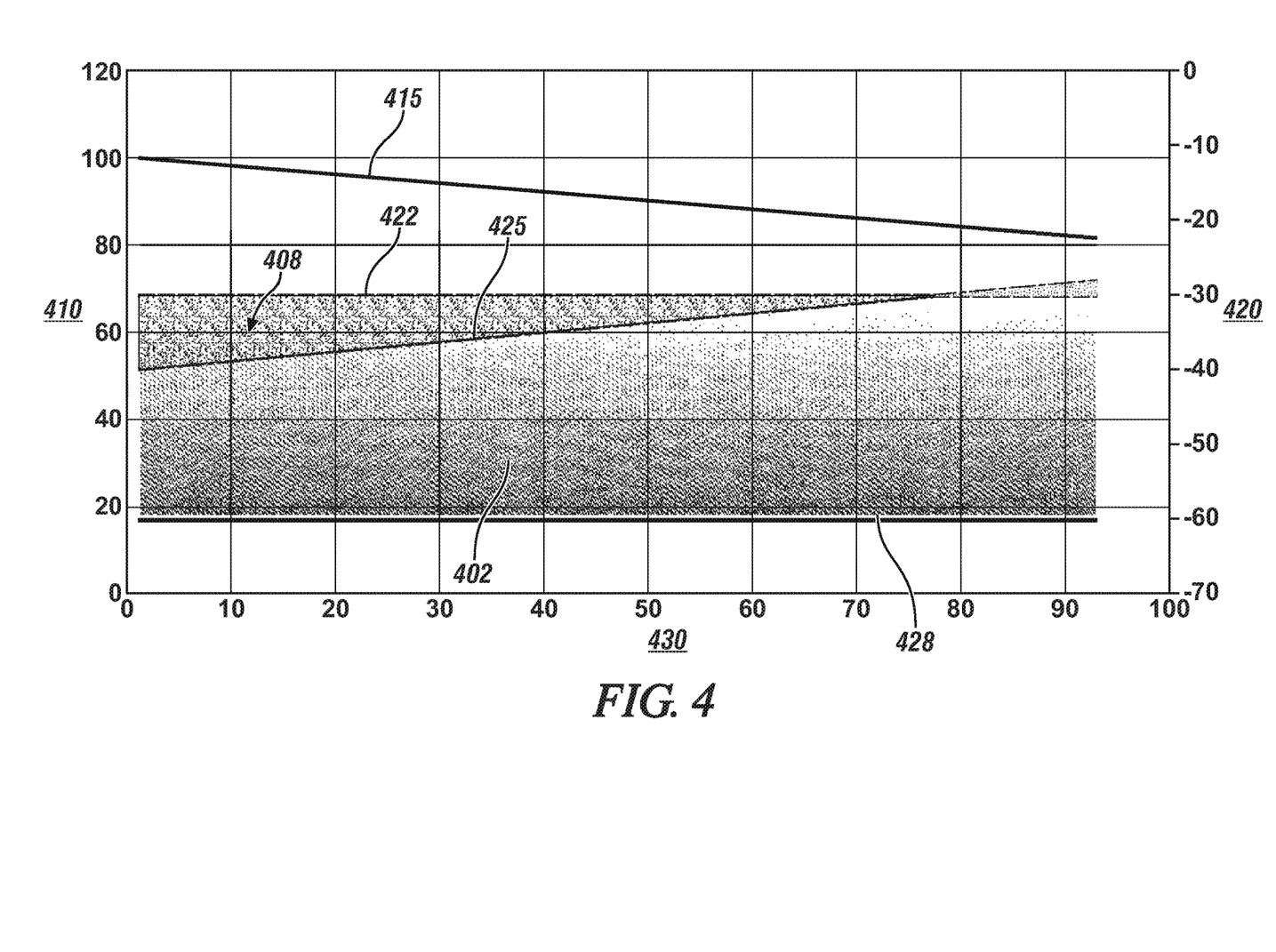
FIG. 4 graphically illustrates vehicle speed levels and torque levels associated with entry into and operation in the coasting mode, in accordance with the disclosure.

FIG. 4 graphically illustrates vehicle speed levels and torque levels associated with entry into and operating in the coasting mode. Magnitude of vehicle speed 410 is indicated on the left vertical axis and magnitude of torque 420 is indicated on the right axis in relation to the horizontal axis 430. Plotted data includes vehicle speed 415, an engine-off threshold torque 422, axle torque 425, and an FCO torque threshold 428 at an output torque request that equals zero.

When the vehicle is operating in a first region 402, which is between the axle torque 425 and the FCO torque threshold 428, entry into the coasting mode is permissible so long as the secondary enablement criteria have been met.

When the vehicle is operating in a second region 408, which is between the axle torque 425 and the engine-off threshold torque 422, entry into the coasting mode is permissible so long as the secondary enablement criteria have been met, thus minimizing or preventing dithering between the engine ON mode and the engine OFF mode. However, it may be advantageous to operate with the engine ON and employing vehicle friction braking to achieve the output torque request.

In this manner, vehicle operation in the coasting mode may be advantageously employed to operate with the internal combustion engine in the OFF state thus reducing fuel consumption, and also operate at times with the internal combustion engine in the FCO state with regenerative braking to increase battery charging and thus also reduce fuel consumption.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A powertrain system for a vehicle, comprising:
   an internal combustion engine selectively coupled to a driveline, wherein the internal combustion engine is configured to operate in a coasting mode, wherein the coasting mode includes operating the powertrain system with the internal combustion engine in an OFF state;
   a plurality of devices disposed to monitor vehicle operating conditions;
   a cruise control system configured to control the powertrain system to generate torque to maintain vehicle speed at a target speed, wherein the target speed includes a speed offset and an adjusted speed offset associated with the coasting mode, wherein the adjusted speed offset is greater than the speed offset; and
   a controller, operatively connected to the internal combustion engine and in communication with the plurality of devices disposed to monitor vehicle operating conditions;
   the controller including an instruction set, the instruction set executable to:
   determine vehicle speed,
   determine an output torque request, activate the cruise control system;
decouple the internal combustion engine from the driveline,
control the internal combustion engine to operate in the coasting mode when the output torque request is within a predetermined torque region and the vehicle speed is greater than a minimum speed threshold,
control the internal combustion engine to exit the coasting mode when the vehicle speed exceeds the target speed combined with the adjusted speed offset; and
control the internal combustion engine to discontinue operating in the coasting mode in response to one of the output torque request being outside the predetermined torque region or the vehicle speed being less than the minimum speed threshold.

2. The powertrain system of claim 1, comprising the internal combustion engine being selectively coupled to the driveline via activation of a disconnect clutch, wherein the coasting mode includes the internal combustion engine being controlled in the OFF state and decoupled from the driveline via the disconnect clutch.

3. The powertrain system of claim 1, wherein the output torque request being within the predetermined torque region comprises the output torque request being within a region of +5% and −5% of a maximum torque output of the internal combustion engine.

4. The powertrain system of claim 1, further comprising the instruction set being executable to control the internal combustion engine to discontinue operating in the coasting mode in response to an operator request for braking.

5. The powertrain system of claim 1, further comprising the instruction set being executable to control the internal combustion engine to discontinue operating in the coasting mode in response to an operator request for acceleration.

6. The powertrain system of claim 1, wherein the instruction set is executable to:
determine secondary enablement criteria based upon inputs from the plurality of devices disposed to monitor the vehicle operating conditions,
control the internal combustion engine to operate in the coasting mode when the output torque request is within the predetermined torque region, the vehicle speed is greater than the minimum speed threshold, and the secondary enablement criteria are met, and
control the internal combustion engine to discontinue the operating in the coasting mode in response to the secondary enablement criteria no longer being met.

7. The powertrain system of claim 6, wherein the plurality of devices disposed to monitor vehicle operating conditions comprises an engine coolant temperature sensor, wherein the secondary enablement criteria includes engine coolant temperature, and wherein the instruction set is executable to control the internal combustion engine to discontinue the operating in the coasting mode when the engine coolant temperature is less than a minimum temperature, wherein the minimum temperature is associated with internal combustion engine operation to achieve a minimum exhaust temperature for exhaust purification.

8. The powertrain system of claim 6, wherein the plurality of devices disposed to monitor vehicle operating conditions comprises an engine coolant temperature sensor, wherein the secondary enablement criteria includes engine coolant temperature, and wherein the instruction set is executable to control the internal combustion engine to discontinue the operating in the coasting mode when the engine coolant temperature is greater than a maximum temperature.

9. The powertrain system of claim 6, wherein the plurality of devices disposed to monitor vehicle operating conditions comprises an ambient temperature sensor, wherein the secondary enablement criteria includes ambient temperature, and wherein the instruction set is executable to control the internal combustion engine to discontinue the operating in the coasting mode when the ambient temperature is less than a minimum temperature.

10. The powertrain system of claim 6, wherein the plurality of devices disposed to monitor vehicle operating conditions comprises an ambient temperature sensor, wherein the secondary enablement criteria includes ambient temperature, and wherein the instruction set is executable to control the internal combustion engine to discontinue the operating in the coasting mode when the ambient temperature is greater than a maximum temperature.

11. The powertrain system of claim 6, further comprising an electric machine being coupled to the internal combustion engine; wherein the plurality of devices disposed to monitor vehicle operating conditions comprises a device disposed to monitor a battery that is electrically connected to the electric machine, wherein the secondary enablement criteria includes battery state-of-charge (SOC), and wherein the instruction set is executable to control the internal combustion engine to discontinue the operating in the coasting mode when the battery SOC is less than a minimum SOC.

12. The powertrain system of claim 6, wherein the plurality of devices disposed to monitor vehicle operating conditions comprises a cabin environmental control switch that is configured to control operation of a heating-ventilation-air-condition (HVAC) system, wherein the secondary enablement criteria includes activation of the HVAC system, and wherein the instruction set is executable to control the internal combustion engine to discontinue the operating in the coasting mode when the HVAC system is activated.

13. A method for controlling a powertrain system for a vehicle, the powertrain system including an internal combustion engine coupled to a driveline via a disconnect clutch, and the vehicle including a cruise control system configured to control the powertrain system to generate torque to maintain vehicle speed at a target speed, wherein the target speed includes a speed offset and an adjusted speed offset associated with the coasting mode, wherein the adjusted speed offset is greater than the speed offset; wherein the internal combustion engine is configured to operate in a coasting mode, wherein the coasting mode includes operating the powertrain system with the internal combustion engine in an OFF state, the method comprising:
monitoring vehicle speed;
monitoring an output torque request;
activating the cruise control system;
monitoring a plurality of secondary enablement criteria;
controlling the internal combustion engine to operate in the coasting mode when the output torque request is within a predetermined torque region, the vehicle speed is greater than a minimum speed threshold, and the secondary enablement criteria are met;
controlling the internal combustion engine to exit the coasting mode when the vehicle speed exceeds the target speed combined with the adjusted speed offset; and
discontinuing operating in the operating in the coasting mode when the output torque request is outside the predetermined torque region.

14. The method of claim 13, further comprising discontinuing operating in the coasting mode when the vehicle speed is less than the minimum speed threshold.

15. The method of claim 13, further comprising discontinuing operating in the coasting mode when the secondary enablement criteria is no longer being met.

16. The method of claim 13, comprising operating in the coasting mode when the vehicle speed is within a permissible speed operating band in conjunction with the output torque request being within a band that includes an operator input to an accelerator pedal being near 0% and an operator input to an brake pedal being near 0%.

* * * * *